Figure 1:
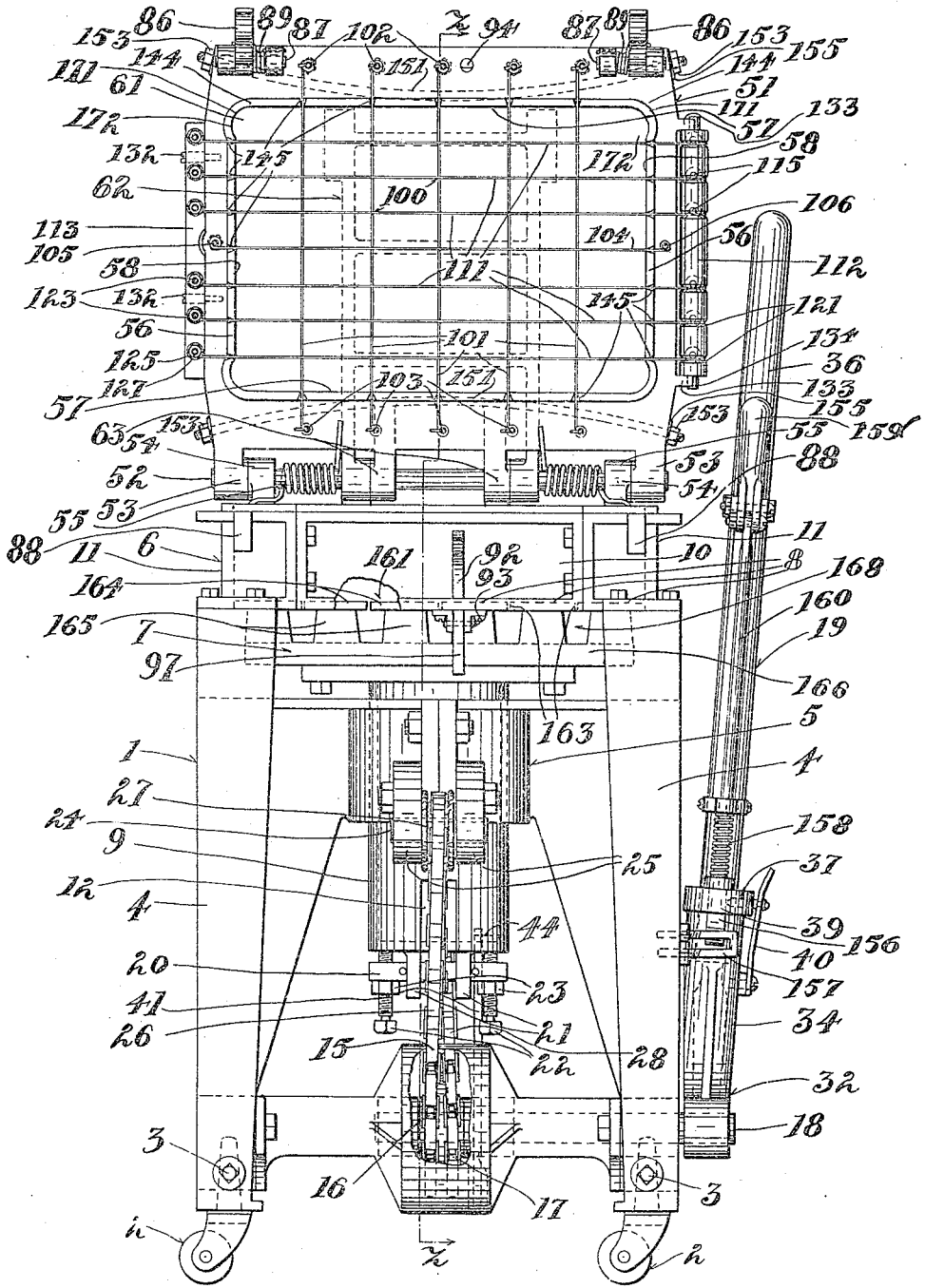

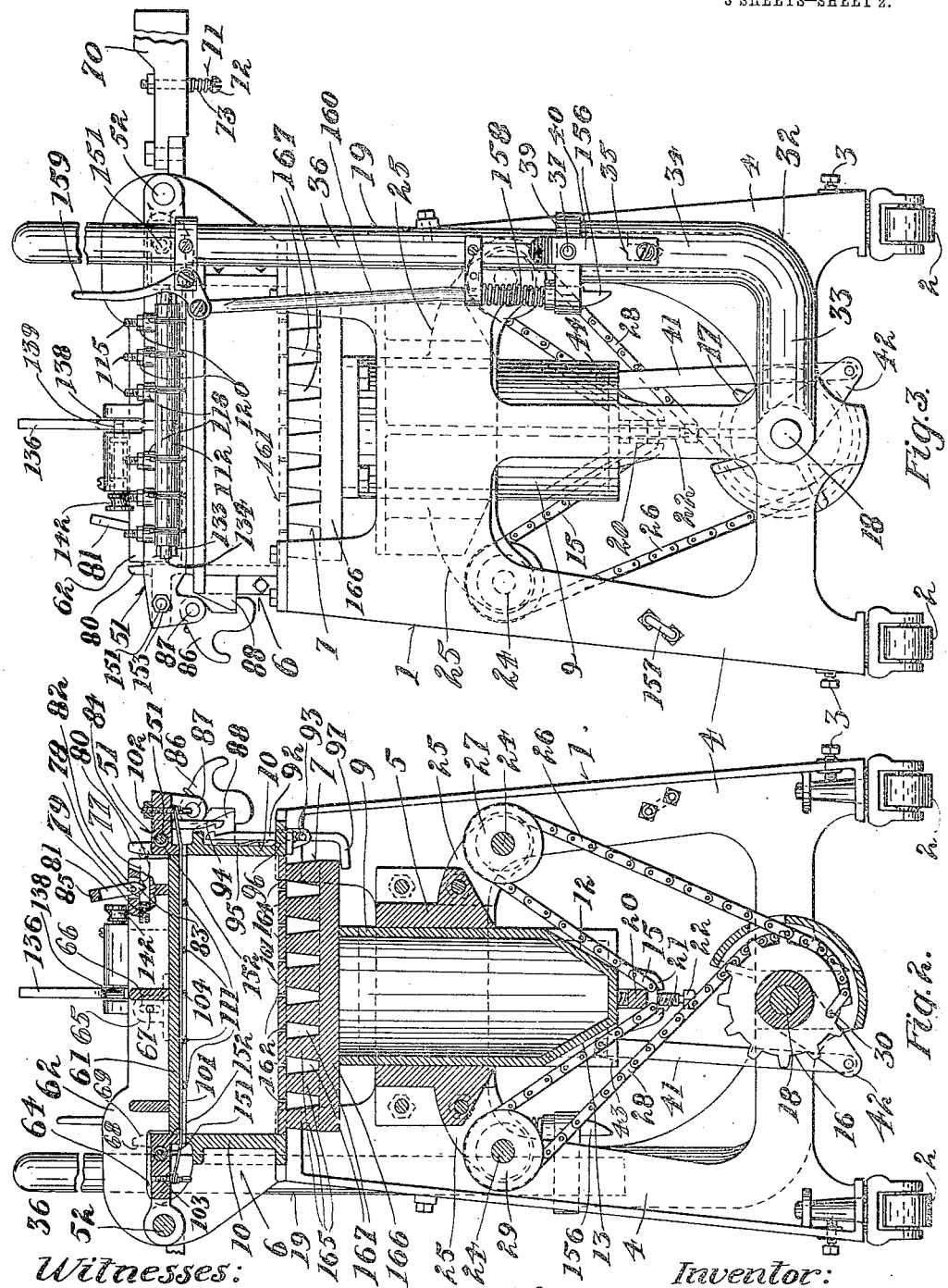

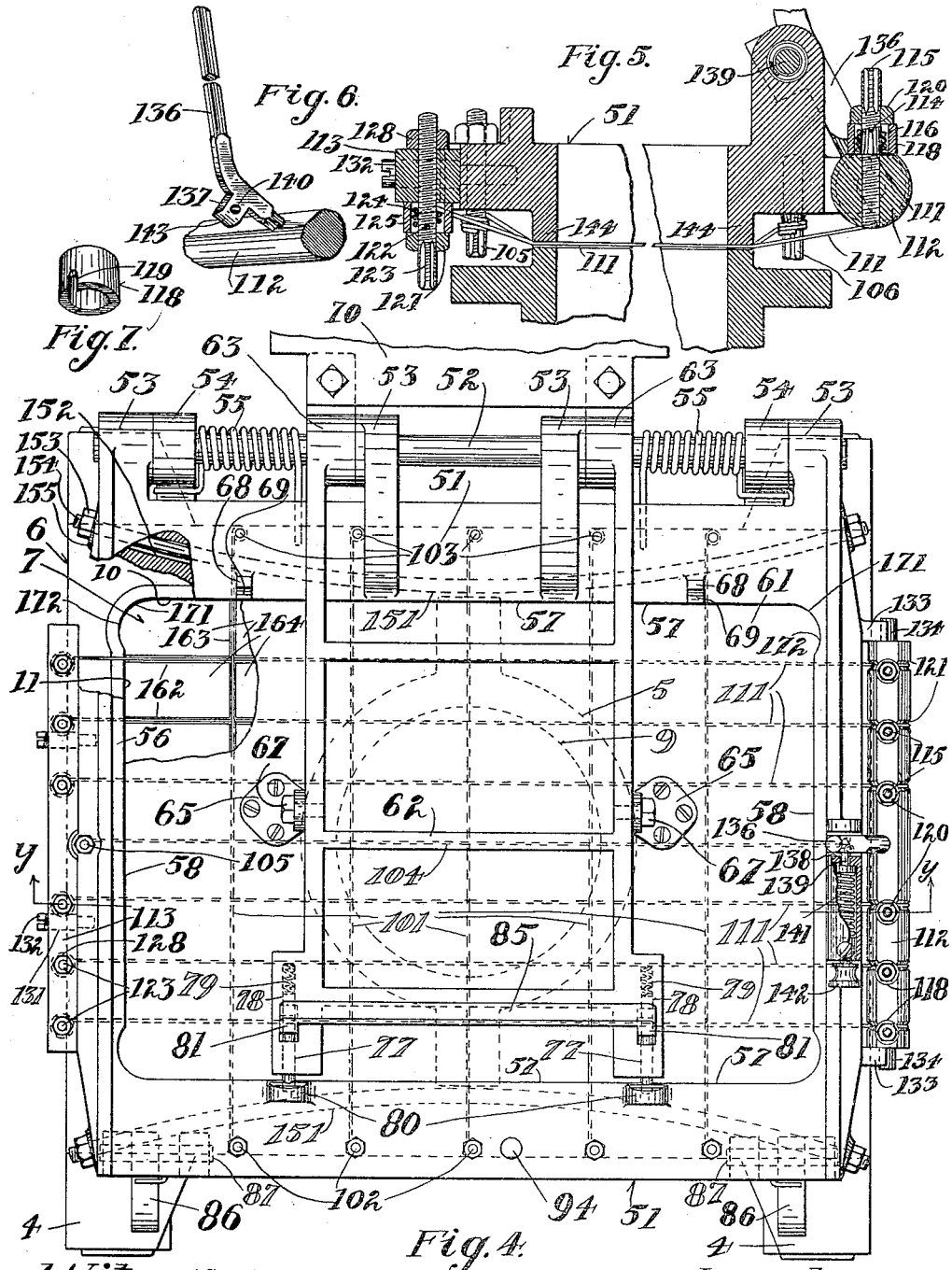

UNITED STATES PATENT OFFICE.

CLEMENS OSKAMP, OF CINCINNATI, OHIO.

DIVIDING-MACHINE.

1,125,386.    Specification of Letters Patent.    Patented Jan. 19, 1915.

Application filed March 29, 1910. Serial No. 552,258.

*To all whom it may concern:*

Be it known that I, CLEMENS OSKAMP, a citizen of the United States, residing at Cincinnati, in the county of Hamilton and State of Ohio, have invented certain new and useful Improvements in Dividing-Machines, of which the following is a specification.

My invention relates to dividing machines for dividing plastic material, and is especially applicable for dividing dough for bakers' use, for instance, for dividing batches of the same into smaller portions of predetermined size or weight.

My invention consists in providing a machine comprising a box or receiver, one end of which is movable, and arranged to press the dough or other plastic material against the other end in order to spread the batch by pressure, with cutting means arranged to act upon the batch after the same has been spread, preferably by a further movement of the first-named end of said box; further in providing means for pressing the batch against a movable end of the box which is arranged to be released for permitting further relative movement between the material and cutting means for dividing the batch; further in novel construction of the end-member of the box; and, further in novel cross-sectional form of the box whereby the plastic material is permitted to fill the corners of the box, the corners being so formed that the corner-pieces after the batch is cut shall be of the same size or weight as the others of said pieces.

My invention consists further in novel means for causing reciprocation of the movable part of the box; further in providing a box-extension in novel relation to the mechanism; and further in novel automatic means whereby the box-extension is locked in place except at predetermined positions of the mechanism.

The invention will be further readily understood from the following description and claims, and from the drawings, in which latter:

Figure 1 is a front elevation of my improved device with the movable frames in raised position. Fig. 2 is a vertical section of the same on the line z—z of Fig. 1, with the movable frames in lowered position. Fig. 3 is a side elevation of the same. Fig. 4 is a plan view of the same, partly broken away for better illustration of parts. Fig. 5 is a vertical section showing details of the wire-stretching mechanism on the line y—y of Fig. 4. Fig. 6 is a perspective detail of the locking handle for the supplemental cutting-wires; and, Fig. 7 is a perspective view of one of the coil-receiving sleeves for the supplemental cutting-wires.

1 represents the main frame which is supported on suitable rollers 2, the rollers at the lever-side of the machine being positioned, as by set-screws 3, for presenting the axes of the same at right angles to the pivotal axis of the operating lever for preventing shifting of the machine during operation.

In the form shown the frame comprises legs 4 and a central bearing 5.

6 is a box supported on the legs, for receiving the batch of plastic material or dough. This box has an end-member 7, shown as the bottom of the box. The end-member comprises contacting plates arranged to contact the plastic material. The contact-plates, as shown, collectively form the bottom face of the box. The end-member, as shown, is arranged to reciprocate in the box. It is secured to a plunger 9 reciprocating in the bearing 5. The box has front and rear walls 10 and side walls 11.

15 is a sprocket chain, being shown as a continuous chain, the ends of which are secured to and received side by side over sprocket-wheels 16 17 secured to a rock-shaft 18 having an operating lever 19 secured thereto. The sprocket-chain is received under an adjusting bar 20 adjustable up and down between lugs 21 at the bottom of the plunger by means of adjusting screws 22 received against the bottom of the plunger and having jam-nuts 23 thereabout. One of the stretches 26 of the sprocket-chain passes over an idler roller 27 and thence to the forward part of the face of the sprocket-wheel 16. The other stretch 28 of the flexible connection passes over an idler roller 29 and thence to the same part of the face of the sprocket-wheel 17 to which the stretch 26 passes on the sprocket-wheel 16. The respective stretches are received in recesses 12 13 in the lower end of the plunger. The ends of the respective stretches are secured to the sprocket-wheels by pins 30.

The idler rollers 27 29 are respectively mounted on studs 24 in brackets 25 of the frame.

The operating lever comprises a bent arm 32 having a rearwardly extending portion 33 and an upwardly extending portion 34, the latter having a socket 35 for releasably receiving the lever-rod 36. There is a latch 37 received in a hole of a collar 39 on the lever-rod and normally pressed inwardly by a spring 40.

The construction stated and the manner of attaching the sprocket-chains and arranging the same with relation to the plunger, causes both ends of the sprocket-chain to move in the same direction upon movement of the operating lever, provides for equalization of the forces applied to said plunger, and provides a maximum of movement in that both ends of the sprocket-chain act simultaneously directly on the plunger.

For causing retraction of the plunger, there is a link 41 which has attachment with the plunger and with an arm 42 on the rock-shaft 18. I provide a loose connection for this link, as the angular relations between the sprocket-chain and plunger and between the link and its arm change during operation, and I accomplish this connection by providing an aperture 43 in the plunger in which the link is received, the inner end of the link having a pin 44 therein which is normally distanced from the inner end of the aperture, the retracting force of the link being applied upon contact of said pin with the inner end of the wall of said aperture.

51 is a main movable frame for the other end of the box and is shown as a swinging frame, swinging on a shaft 52 received through bearings 53 on the movable frame, and bearings 54 on the main frame. The main movable frame is normally held in raised position by springs 55 received about the shaft 52. The main movable frame comprises a box-extension 56 having front and rear walls 57 and side walls 58, which are in line with the respective walls of the box and serve as continuations of said last-named walls.

61 is a pressure-board arranged to normally close the said other end of the box. It is movably mounted with relation to the main movable frame, as on a supplemental movable frame 62 which swings about the shaft 52 on bearings 63. This pressure-board has movement with relation to the main movable frame 51 and is also arranged to be releasably connected therewith, so as to move therewith, and preferably is loosely mounted with relation to the supplemental movable frame for permitting ready connection between the supplemental movable frame and the main movable frame.

The supplemental movable frame is provided with recesses 64 in its lower face adjacent to its pivot for accommodating the rear wall of the box-extension and permitting the pressure-board to be received in said box-extension adjacent to the end of the box.

It will be understood that in operation a close mating of the edges of the pressure-board and the walls of the box and box-extension is necessary in order to prevent the squeezing of the plastic material between the same. It will also be noted that the supplemental movable frame swings in arcs from its pivot and that the pressure-board is received in the box-extension adjacent to the end of the main box. If now, the pressure-board were rigidly secured to the supplemental movable frame, there would be interference between its front and rear edges and the front and rear walls of the box-extension when the same is moved into and out of said box-extension. To avoid this I mount the pressure-board upon the supplemental movable frame. Thus I provide the pressure-board with hangers 65 in each of which there is a slot 66 which receives a bolt 67 at each side of the supplemental movable frame, this connection being a loose connection for readily allowing movement between the pressure-board and the main movable frame. The rear wall of the box-extension is provided with guiding lugs 68 having inclined faces 69 arranged to be contacted by the pressure-board for guiding the rear end of the pressure-board between the front and rear walls of the box-extension when the pressure-board is moved into the box-extension. The bolts 67 are preferably located slightly to the rear of the transverse median line of the box so that when the pressure-board is released and caused to rise this relation of the parts and the loose hanging of the pressure-board upon the supplemental movable frame will permit the movable frame to be pulled upwardly without binding upon the front and rear walls of the box-extension.

For automatically raising the supplemental movable frame with relation to the main movable frame, I provide it with a counter-weight 70, there being a cushion-stop 71 for the supplemental movable frame which comprises a bolt 72 passing through an aperture in the counter-weight and arranged to contact the main frame, the bolt being backed by a cushion-spring 73.

77 are latches for connecting the supplemental movable frame to the main movable frame. Each of the latches is arranged to reciprocate in a bore 78 of the supplemental movable frame in which there is a spring 79 for forcing the latch outwardly into engagement with a keeper 80 on the main movable frame.

81 is a releasing lever pivoted at 82 to the supplemental movable frame, one end of the lever having a lug 83 received in a recess 84 of the latch, the other ends of the levers being connected by a cross-bar 85.

These latches form locks for locking the supplemental movable frame to the main movable frame.

For locking the main movable frame to the box or main frame I provide latches 86 each of which is pivoted on a pin 87, the nose of the latch being arranged to be pressed under a keeper 88 on the box by a spring 89.

For preventing raising of the main movable frame while the plunger end of the box is in a position between the walls of the box-extension on the main movable frame, which would cause binding of the parts, I provide an automatic lock which comprises a latch 92 pivoted on a pin 93 to the main frame and received over a keeper 94 on the main movable frame, a spring 95 normally causing engagement of the latch. The latch passes through a slot 96 in the main frame which limits its movement in either direction. The latch 92 has an inwardly bent tail 97 which is arranged to be engaged by the movable end of the box when this movable end is in out position. This construction therefore permits the main movable frame when once it has been placed in operative position, to be released only when the plunger is in out position, which automatically prevents a relative movement of the main movable frame and box when the parts are in such position that such movement would create a binding of the parts.

100 represents the cutting means. I show these cutting means as wires and prefer to form the same in two sets, one of which is a supplemental set and forms subdivisions of the other set, the supplemental set being readily removed so that the plastic material may be divided into larger pieces or so that the supplemental wires may be conveniently and quickly put in place and the plastic material subdivided into smaller pieces. Thus I show wires 101 which are stretched between the forward and rear walls of the main movable frame. I accomplish the securing and stretching of these wires by means of bolts 102 103 in a manner to be presently described with relation to the manner of securing the supplemental cutting wires in place, with the exception that the sleeves there described may be omitted. There is also a cross-wire 104 secured to and stretched between bolts 105 and 106 in similar manner. The wires 101 104 form one of the sets of cutting agencies and may be so positioned for instance as to properly divide the dough into sizes suitable for loaves of bread. Ready means are also provided for subdividing these divisions suitably for instance for rolls by providing wires 111 secured to bars 112 113 which are releasably secured to the main cutting-frame and form a supplemental cutting-frame, and the wires 111 are also preferably secured to said bars in such manner that they will not unwrap when the supplemental cutting-frame is removed from the main cutting-frame, so that their tension may be always the same when the bars are placed on the main movable frame. Thus each of the wires 111 has one end received through a hole 114 in a bolt 115, the wire being coiled about said bolt so that the stretch of the wire will extend from the inner end of the coils 116. The bolt has a shoulder 117 up to which it is screwed in a threaded socket in the bar 112. The stretch of the wire is led from that side of the bolt which will have a tendency to screw the bolt inwardly into locking position. A sleeve 118 is received about the coils of the wire in close connection therewith for preventing unwinding of the same, the sleeve having a recess 119 through which the wire passes in its stretch across the frame, the sleeve being held in place by a nut 120.

The wire in its stretch first passes part way around the bar 112 in a groove 121 in said bar, the bar acting as a spanner for the wires when the supplemental wires are attached to the main cutting-frame. The other end of the wire passes through a hole 122 in a bolt 123 and is coiled about said bolt, the coils 124 of said wire being in a sleeve 125 having a recess similar to recess 119 for receiving the wire, a nut 127 clamping the sleeve in place, the bolt 123 being received in a threaded bore in the bar 113. These coils 124 also extend toward the inner end of the bolt 123, and the wire is received about said bolt at that side thereof at which its stretching will have a tendency to unscrew the bolt, which is however resisted and the bolt firmly held by a lock-nut 128. This construction permits the bars and wires to be removed from the main movable frame without changing the relative relations of the ends of the wires to the bars. The bar 113 has holes 131 received about studs 132 secured to one of the sides of the main movable frame. The other side of the main movable frame has bearings 133 thereon into which the trunnions 134 on the bar 112 are received. The bar 112 is preferably a round bar having the annular grooves 121 in which the wires 111 are received and also has a handle 136 by means of which it is turned, on which handle there is a locking lug 137 received between the walls of a recess 138 in the main movable frame into engagement with the locking pin 139 which is received in a hole 140 in said locking lug, the pin being pushed inwardly by a spring 141 and having a pull-handle 142, the lug having an inclined entering end 143 in advance of the hole 140 for pushing the pin aside and permitting it to readily enter the hole.

The main movable frame is provided with an inwardly extending flange 144 which forms the inner end of the box-extension. The inner end of this flange is provided with notches 145 arranged to receive the cutting wires in proper position cross-wise of the box, and for guiding the wires, these notches having comparatively wide mouths adjacent to the attaching ends of the wires. The notches in the ends of said walls also permit the walls of the box and box-extension to be placed in close mating relation when said box-extension is placed upon said box. Great force is in practice exerted by these wires and for reinforcing the front and rear walls of the box-extension to resist these forces I provide truss-rods 151 which are arranged in curved form and are received in bores 152 formed in the casting of the main movable frame by means of coring, nuts 153 received over the threaded ends 154 of said truss-rods and against shoulders 155 on said main movable frame exerting stretching strain on said truss-rods and forcing the concave walls of their curves against the outer faces of said bores in the walls of said casting.

In operation, the dough or other plastic material intended to be divided is weighed for forming a batch, the weight of which will be the sum of all the divisions intended to be made in the operation. This batch is placed in the box while the movable end-member thereof is in out position and the movable frames are in up position, and the batch spread by hand to reasonable extent. The main movable frame, carrying with it the box-extension, the cutting means and the supplemental movable frame, is then swung into place upon the box, the main movable frame being automatically clamped to the box by the latches 86, the supplemental movable frame also being in locked relation with the main movable frame. The swinging of the main movable frame into locked position brings the pressure-board to the inner end of the box-extension, the same being located against the cutting-wires. The operating lever is then moved for moving the plunger and causing the movable end-member of the box to move upwardly in the box, and thereby press the batch in the box against the wires and pressure-board. The lever is thereby moved to substantial extent throughout its arc of movement. When the proper pressure has been applied to the batch, the latches 77 are released by pulling on the cross-bar 85, the counter-weight causing automatic raising of the supplemental movable frame, while the loose hanging connection of the pressure-board therefrom permits the same to move out of the box-extension without binding upon its walls. The movement of the operating lever is then continued, which causes further movement of the movable end-member upwardly in the box, and causes the pushing of the batch past the cutting-wires, thereby cutting or dividing the batch into smaller pieces, depending on the number and arrangement of the cutting-wires. The lever is then held at its limit of movement by means of a latch 156 slidable in a bearing in the collar 39 and received in a keeper 157 at the side of the frame, the latch being pressed into engagement with the keeper by a spring 158 and having connection with a retracting handle 159 by means of a link 160. The latch, handle and spring are mounted on the lever-rod 36 and removable therewith from the socket 35. The top of the movable end-member is now at substantial level with the upper end of the box-extension, and the divided material is removed, and the operating lever is returned to initial position, which also returns the plunger, the automatic lock being thereby released. The main movable frame is then swung back, which thereby becomes locked to the supplemental movable frame, and the machine is ready for a repetition of the operation.

The movable end-member of the box is shown formed as a plunger, having an engaging part 161 for the plastic material, this engaging part being divided by means of slots 162 163, shown as cross-slots, into engaging plates 164, each of which is mounted on a pedestal 165 supported from the base 166 of the end-member, suitably secured to the plunger, there being recesses 167 168 forming clearance-spaces between the pedestals, these recesses being wider than the slots 162 163, the said slots merging into said recesses, and the recesses being shown as continuous cross-recesses which respectively extend from front to rear and from end to end of the end-member.

When the plunger pushes the dough through the spaces between the cutting-wires, the movement of the plunger continues until the wires have been received in the slots 162 163, thereby passing entirely through the plastic material, and may be continued so that the wires will be in the recesses under said slots. In thus passing through the plastic material, a slight portion of the same will adhere to the wires and be pushed through the slots into the recesses thereunder, remaining in said recesses when the plunger is returned to initial position. This gives a clean cut to the various divisions of plastic material and provides easy means by which the remnants or waste received in the recesses may be removed.

It has been found in practice that dough cannot be squeezed into an angular corner unless special pressure is exerted which would be detrimental to the quality of the dough. To avoid this I have shown rounded corners of peculiar form for the box and box-extension and for the material engaging parts of the plunger and pressure-board, by means of which the plastic material is readily forced into the corners, and at the same time they are of such form that the corner-pieces cut from the batch will be of weight or size equal to pieces in other parts of the batch. For accomplishing this, I form each corner with a curve 171 which intersects one of the walls adjacent to the corner to one side of a point at which the lines of said adjacent walls would intersect each other, if extended, the said curve intersecting the line of the other of said walls, if extended, at two points. In this form, the corner-piece of the divided plastic material is smaller at one of its walls but has a bulge 172 on the other of its walls equal to the size which said corner-piece is smaller at said first-named wall. This form of corner also permits the dough to be squeezed against the walls of the corner.

Having thus fully described my invention, what I claim as new and desire to secure by Letters Patent is:

1. In a dividing machine for plastic material, the combination of a box in which the plastic material is received, an end-member normally forming one end of said box, said box having material-retaining side walls, and said end-member having close sliding connection with the inner faces of said side walls, cutters across the other end of said box, said end-member and cutters being normally in separated relation, said end-member provided with slots receiving said cutters and with recesses of greater width than said slots with which said slots connect at the ends of said slots distanced from said cutters and constructed and arranged for receiving said cutters and the waste of plastic material caused by the cutting action thereof, and means for causing reciprocation between said end-member and said box and cutters for causing said end-member to be located at the other end of said box and said cutters to be received through said slots and into said recesses at said other end of said box.

2. In a dividing machine for plastic material, the combination of a box for receiving the plastic material, a box-extension, cutters between said box and box-extension, said box and box-extension mounted for relative movement one with relation to the other, said box and box-extension having walls which are substantially in line with each other, a cover received within the space between said walls of said box-extension adjacent to and at one side of said cutters, an end-member at the other side of said cutters extending into and substantially filling the space between the walls of said box, and means for causing reciprocation between said end-member and said cutters and cover whereby said plastic material is compressed in said box between said end-member and cover and said compressed plastic material is divided by said cutters by said reciprocation which locates the material-contacting surface of said end-member and said compressed plastic material in a position past said cutters in said box-extension.

3. In a dividing machine for plastic material, the combination of a material-receiving box provided with side walls, an end-member between said walls, a pivoted cutter-frame, cutters on said cutter-frame, said cutter-frame having a box-extension thereon provided with side walls substantially coincident with the longitudinal projections of said side walls of said box, said cutters located between said side walls of said box-extension and said side walls of said box, a pivoted pressure-board, means for releasably securing said pressure-board in said box-extension between the walls thereof, the pivotal axes of said cutter-frame and pressure-board being coincident for combined movement of said cutter-frame and pressure-board while the latter is maintained within said box-extension, and means for causing approaching and receding movement between said end-member and pressure board.

4. In a dividing machine for plastic material, the combination of a material-receiving box provided with side walls, an end-member between said walls, a pivoted cutter-frame, cutters on said cutter-frame, said cutter-frame having a box-extension thereon provided with side walls substantially coincident with the longitudinal projections of said side walls of said box, said cutters located between said side walls of said box-extension and said side walls of said box, a pivoted pressure-board, means for releasably securing said pressure-board in said box-extension between the walls thereof, the pivotal axes of said cutter-frame and pressure-board being coincident for combined movement of cutter-frame and pressure-board while the latter is maintained within said box-extension, and means for causing approaching movement between said end-member and pressure-board for causing said end-member to be received in said box-extension, automatic locking means acting to lock said box-extension in place during location of said end-member in said box-extension, and automatic means for releasing said locking means when said end-member and pressure-board are moved into normal separated relation.

5. In a dividing machine for plastic material, the combination of a box, a box-extension, cutting means between the same, said box and box-extension having movement one relative to the other, an end-member for said box having a material-contacting surface arranged to pass from said box past said cutters into said box-extension, means for causing reciprocating movement between said end-member and box-extension relative one to the other, locking means between said box and box-extension acting to lock said box and box-extension together during reception of said end-member in said box-extension, and automatic releasing means for said locking means controlled by a part having said reciprocating movement acting for release of said locking means when said box-extension and end-member are moved into normal separated relation, substantially for the purpose described.

6. In a dividing machine for plastic material, the combination of a material-receiving box having sides and a plurality of dough-dividing cutters between each pair of opposite ones of said sides, the material-contacting faces of said pairs of sides extending at right angles to each other, for dividing the space between said sides into a plurality of compartments all the corners whereof are right-angle corners except at the corners of said box, each of said last-named corners being so formed in cross-section that a portion of one of the sides of said corner is located within the right-angle of the planes of said material-contacting faces of said sides of said box, and a portion of the other of said sides of said corner is located outside said right-angles, for forming all of said compartments of equal cross-sectional dimensions.

7. In a dividing machine for plastic material, the combination of a box for receiving the plastic material, a bottom-member therefor having a dough-contacting part provided with slots, a box-extension having pivotal connection with relation to said box, said box and box-extension having substantially coincident side-walls, cutting wires arranged coincident with said slots between said box and box-extension, an independently movable pressure-board received within said box-extension, locking means between said pressure-board and box-extension whereby combined movement of said pressure-board and box-extension is permitted independent of said box, releasable locking means between said box-extension and box, and means for raising said bottom-member for passing the dough-contacting part thereof past said cutting wires into said box-extension, substantially for the purpose described.

In testimony whereof, I have signed my name hereto in the presence of two subscribing witnesses.

CLEMENS OSKAMP.

Witnesses:
R. S. OPPENHEIMER,
LILLIAN BURNETT.

Copies of this patent may be obtained for five cents each, by addressing the "Commissioner of Patents, Washington, D. C."